United States Patent [19]

Hida et al.

[11] Patent Number: 4,810,731
[45] Date of Patent: Mar. 7, 1989

[54] ULTRAVIOLET-CURABLE ORGANOPOLYSILOXANE COMPOSITION

[75] Inventors: Yoshinori Hida; Shohei Kozakai, both of Gunma, Japan

[73] Assignee: Shin-Etsu Chemical Co., Ltd., Tokyo, Japan

[21] Appl. No.: 179,832

[22] Filed: Apr. 8, 1988

Related U.S. Application Data

[63] Continuation-in-part of Ser. No. 947,187, Dec. 29, 1986, abandoned.

[30] Foreign Application Priority Data

Jan. 9, 1986 [JP] Japan .................... 61-2364

[51] Int. Cl.$^4$ .................... C08G 77/44; C08G 77/20
[52] U.S. Cl. .................... 522/33; 522/60; 522/62; 522/99; 528/12; 528/21; 528/24; 528/30; 528/32
[58] Field of Search .................... 522/99, 33, 60, 62; 528/21, 24, 30, 32, 12

[56] References Cited

U.S. PATENT DOCUMENTS

| | | | |
|---|---|---|---|
| 3,337,497 | 8/1967 | Bostick | 528/30 |
| 4,045,390 | 8/1977 | Itoh | 528/32 |
| 4,163,082 | 7/1979 | Romenesko | 522/99 |

Primary Examiner—John C. Bleutge
Assistant Examiner—David Buttner
Attorney, Agent, or Firm—Wyatt, Gerber, Burke and Badie

[57] ABSTRACT

Whereas the mechanism for the crosslink formation in the curable organopolysiloxane composition of the invention is the ultraviolet-induced addition reaction between alkenyl, e.g., vinyl, groups in a diorganopolysiloxane and mercaptoalkyl groups in another organopolysiloxane as in conventional compositions, the mercaptoalkyl-containing organopolysiloxane used in the invention is, differently from those in conventional compositions, an organopolysiloxane of a three-dimensionally branched molecular structure as composed of the siloxane units of the formulas $R^1{}_3SiO_{0.5}$, $R^1{}_a(HSR^2)SiO_{(3-a)/2}$ and $SiO_2$, in which $R^1$ is, for example, a methyl or phenyl group, $R^2$ is, for example, $-CH_2CH_2CH_2-$ and $a$ is zero, 1 or 2, in a specified proportion. In addition, the vinyl group-containing siloxane units in the vinyl-containing diorganopolysiloxane are localized in the molecular structure forming two blocks each bonded to one of the terminal silicon atoms. The inventive composition is advantageous in respect of the greatly improved mechanical strengths of the cured silicone rubber obtained by irradiating the composition with ultraviolet light.

6 Claims, No Drawings

ULTRAVIOLET-CURABLE ORGANOPOLYSILOXANE COMPOSITION

BACKGROUND OF THE INVENTION

This is a continution-in-part application from a copending U.S. patent application Ser. No. 947,187 filed Dec. 29, 1986, now abandoned.

The present invention relates to an ultraviolet-curable organopolysiloxane composition or, more particularly, to an organopolysiloxane composition which is liquid before curing and capable of being cured by irradiation with ultraviolet light into a transparent rubbery elastomer having sufficient mechanical strengths.

Various types of ultraviolet-curable silicone rubber compositions are known in the prior art and they are widely used in a variety of industrial appliction fields such as electric and electronic industries, automobiles and other machinery industries, building construction and so on because cured elastomers thereof are excellent in various properties such as heat and cold resistance, surface releasability, electric insulation and the like. A problem common in the conventional ultraviolet-curable silicone rubber compositions, however, is that the cured elastomers thereof have relatively low mechanical strengths greatly limiting the fields of their application.

Although the mechanical strengths of a cured elastomer of such an organopolysiloxane composition can be improved by admixing the composition with a reinforcing filler such as a finely divided fumed silica filler, addition of such fillers is detrimental and undesirable in other respects including increase in the consistency of the composition before curing, retrogression in plasticization, loss of transparency leading to incomplete curing by ultraviolet irradiation and so on.

SUMMARY OF THE INVENTION

An object of the present invention is therefore to provide an organopolysiloxane composition which is liquid before curing and capable of being cured by irradiation with ultraviolet light into a rubbery elastomer having sufficiently high mechanical strengths without the above described problems and disadvantages in the prior art compositions. In particular, the present invention provides a silicone rubber composition capable of giving a cured elastomer having a greatly increased tensile strength without decreasing the elastic modulus and ultimate elongation at break.

Thus, the ultraviolet-curable organopolysiloxane composition provided by the present invention comprises, in admixture:

(A) 100 parts by weight of an organopolysiloxane having a viscosity not exceeding 100,000 centipoise at 25° C., of which the organic groups bonded to the silicon atoms are monovalent hydrocarbon groups including at least six alkenyl groups per molecule;

(B) from 5 to 300 parts by weight of a first mercaptoalkyl-containing organopolysiloxane essentially composed of monofunctional siloxane units of the formula $R^1_3SiO_{0.5}$, tri-, di- or monofunctional siloxane units of the formula $R^1_a(HSR^2)SiO_{(3-a)/2}$ and tetrafunctional siloxane units of the formula $SiO_2$, in which $R^1$ is a monovalent hydrocarbon group free from aliphatic unsaturation, $R^2$ is a divalent alkylene group having 2 to 4 carbon atoms and the subscript a is zero, 1 or 2, in such a proportion that the molar ratio of $[R^1_3SiO_{0.5}+R^1_a(HSR^2)SiO_{(3-a)/2}]:[SiO_2]$ is in the range from 0.5 to 2.5 and the content of the mercapto groups HS is in the range from 0.4 to 6.0% by weight;

(C) up to 300 parts by weight of a second mercaptoalkyl-containing organopolysiloxane of a substantially linear molecular structure having a viscosity not exceeding 100,000 centipoise at 25° C. and containing at least two mercaptoalkyl groups per molecule, the other organic groups bonded to the silicon atoms being monovalent hydrocarbon groups free from aliphatic unsaturation; and (D) from 0.01 to 10% by weight of a photosensitizer based on the overall amount of the components (A), (B) and (C), the molar ratio of the mercaptoalkyl groups in the components (B) and, when added, (C) to the alkenyl groups in the component (A) being in the range from 0.2:1.0 to 5.0:1.0.

In particular, it is preferable that the organopolysiloxane as the component (A) has a substantially linear molecular structure, wich is characterized by the localized distribution of the alkenyl groups bonded only to several silicon atoms at each molecular chain end including or not including the terminal silicon atoms as represented by the general formula

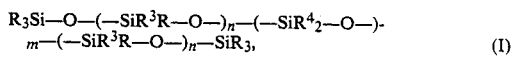

$$R_3Si—O—(—SiR^3R—O—)_n—(—SiR^4_2—O—)\text{-}m—(—SiR^3R—O—)_n—SiR_3, \qquad (I)$$

in which R is a saturated or unsaturated monovalent hydrocarbon group, $R^3$ is an alkenyl group, preferably, having 2 to 4 carbon atoms, $R^4$ is a monovalent hydrocarbon group free from aliphatic unsaturation, the subscript m is a positive integer of at least 6 and the subscript n is a positive integer of at least 3. It is meant by the above given structural formula (I) that the alkenyl-containing siloxane units ($—SiR^3R—O—$) in number of n are bonded together to form a block bonded to the terminal silicon atom and the alkenyl-free siloxane units ($—SiR^4_2—O—$) in number of m to form a block intervening between two blocks of $(—SiR^3R—O—)_n$.

DETAILED DESCRIPTION OF THE PREFERRED EMBODIMENTS

As is understood from the above given summary of the invention, the mechanism of the ultraviolet-induced crosslink formation in the inventive ultraviolet-curable organopolysiloxane composition is the addition reaction between the alkenyl groups in the component (A) and the mercapto groups in the component (B) and, optionally, component (C). The principle of such an addition reaction is well known in the prior art and described in many publications. Characteristically, however, the component (B), i.e. the mercaptoalkyl-containing organopolysiloxane, is very specific and essentially composed of the above described three types of the siloxane units. By virtue of the formulation of this unique mercaptoalkyl-containing organopolysiloxane, the inventive composition, which is liquid before curing, can give a transparent cured elastomer having sufficiently high mechanical strengths when the composition is irradiated with ultraviolet light. Following is a description of the types and amounts of the respective components established as a result of the extensive investigations.

The component (A) is an organopolysiloxane having at least six alkenyl groups bonded to the silicon atoms in a molecule. Such an organopolysiloxane is a well known material in the art. The alkenyl groups should preferably have 2 to 4 carbon atoms or, more preferably, be vinyl groups. Though not particularly limitative, the organopolysiloxane should preferably be a diorganopolysiloxane having a substantially linear molecular structure in order that the composition may have a good rubbery elasticity agter curing. Although the vinyl groups can be bonded to the silicon atoms at any intermediate positions of the molecular chain or to the silicon atoms at the chain terminals and also at the intermediate positions as well, it is preferable that, as is shown by the above given general formula (I), the vinyl group-containing siloxane units form two blocks of the formula (—SiR$^3$R—O—)$_n$ each bonded to one of the terminal silicon atoms and the alkenyl group-free siloxane units also form a block of the formula (—SiR$^4$$_2$—O—)$_m$ intervening between two blocks of (—SiR$^3$R—O—)$_n$. The organic groups bonded to the silicon atoms of the diorganopolysiloxane as the component (A) are monovlent hydrocarbon groups and those other than the above mentioned alkenyl groups are selected from the class consisting of alkyl groups, e.g. methyl, ethyl, propyl and butyl groups, aryl groups, e.g. phenyl and tolyl groups, and cycloalkyl groups, e.g. cyclopentyl and cyclohexyl groups. If so desired, a part or all of the hydrogen atoms in these hydrocarbon groups may be replaced with substituent atoms and groups such as halogen atoms and cyano groups. Examples of such a substituted hydrocarbon group include chloromethyl, 3,3,3-trifluoropropyl and 2-cyanoethyl and the like groups.

Examples of the particular organopolysiloxane suitable as the component (A) include those expressed by the following structural formulas, in which the symbols Me, Vi and Ph denote methyl, vinyl and phenyl groups, respectively, the subscripts f, g, h, i, j, k and l are each a positive integer and n is a positive integer larger than 5:

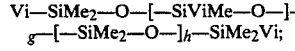

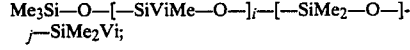

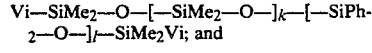

Although the diorganosiloxane units in the above formulas given in the brackets with the subscripts f to l may be bonded to each other at any random sequence in the molecular chain, it is sometimes advantageous that the diorganopolysiloxane has a block-wise molecular structure in which several diorganosiloxane units adjacent to each terminal silicon atom as a block each have an alkenyl group, e.g., vinyl and allyl grouups, bonded to the silicon atom while the units intervening between the alkenyl-containing terminal blocks are free from aliphatic unsaturation. The alkenyl-containing unit in the terminal blocks should preferably be a methyl vinyl siloxane unit —SiMeVi—O— or methyl allyl siloxane unit —SiMeA—O—, the symbol A being an allyl group.

Such a linear organopolysiloxane having a localized distribution of the silicon-bonded alkenyl groups can be represented by the general formula (I) given above, i.e.

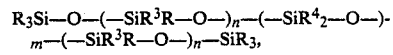

in which each of the symbols R, R$^3$, R$^4$, m and n has the meaning defined above. The formula and the definition of the symbols mean that the linear organopolysiloxane molecule has (2+2n+m) silicon atoms linearly bonded together and the alkenyl groups are bonded only to the (1+n) silicon atoms from each end of the molecular chain while the m silicon atoms intermediate between the sequences of the alkenyl-containing silicon atoms are free from alkenyl groups. The monovalent hydrocarbon groups bonded to the terminal silicon atoms may be alkenyl or non-alkenyl.

Examples of such a block-wise diorganopolysiloxane include those expressed by the following structural formulas, in which the subscripts m and n each have a meaning that the siloxane units of m or n in number in the brackets with the subscript m or n are bonded together as a block, n being 3 or larger and m being 6 or larger, and the subscripts p, q and r are each a positive integer, the symbol Et being an ethyl group:

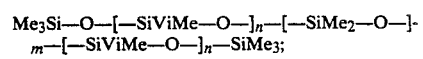

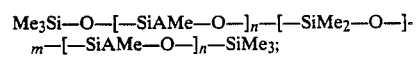

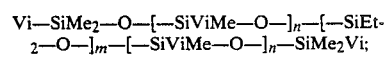

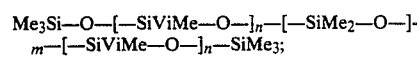

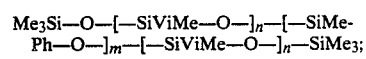

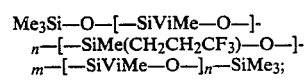

; and

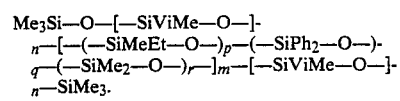

These diorganopolysiloxanes can be prepared according to a known method. For example, the diorganopolysiloxanes having a random molecular structure can be prepared by the equilibration polymerization of a mixture of a cylic organopolysiloxane oligomer and a hexaorganodisiloxane having respective organic groups in the presence of an alkali catalyst. The diorganopolysiloxanes having a block-wise molecular structure can be prepared, for example, by the deamination condensation reaction between an α,ω-dihydroxy dimethylpolysiloxane and a poly(methyl vinyl siloxane) terminated at one end with a dialkylamino group, e.g. dimethyl amino group, and with a trimethyl silyl group at the other end according to the following reaction equation:

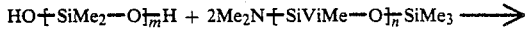

 +

The organopolysiloxane as the component (A) should have a relatively low degree of polymerization and should be liquid and flowable at room temperature in order to ensure good workability of the inventive composition. In this regard, the organopolysiloxane should have a viscosity not exceeding 100,000 centipoise at 25° C.

The component (B) combined with the above described alkenyl-containing organopolysiloxane to give a curable composition is a mercaptoalkyl-containing organopolysiloxane. This component is effective to impart flowability to the composition and to impart transparency and mechanical strengths to the cured elastomer obtained by the ultraviolet irradiation of the composition. The mercaptoalkyl-containing organopolysiloxane should essentially be composed of the monofunctional siloxane units of the formula $R^1_3SiO_{0.5}$, mercaptoalkyl-containing tri-, di- or monofunctional siloxane units of the formula $R^1_a(HSR^2)SiO_{(3-a)/2}$ and tetrafunctional siloxane units of the formula $SiO_2$ in such a proportion that the molar ratio of $[R^1_3SiO_{0.5}+R^1_a(HSR^2)SiO_{(3-a)/2}]:[SiO_2]$ is in the range from 0.5 to 2.5 or, preferably, from 0.7 to 1.4. When the molar ratio is smaller than 0.5, the composition compounded with such a mercaptoalkyl-containing organopolysiloxane would be less flowable and transparent in addition to some difficulties encountered in the preparation thereof. When the molar ratio is larger than 2.5, the curability of the composition would be decreased so that the cured elastomer obtained therefrom may have low mechanical strengths. The organic groups bonded to the silicon atoms other than the mercaptoalkyl groups should be each a monovalent hydrocarbon group free from aliphatic unsaturation.

The mercaptoalkyl-containing organopolysiloxane as the component (B) should contain the mercapto groups HS in an amount in the range from 0.4 to 6.0% by weight. When the content of the mercapto groups is too small, the density of crosslinks formed in the composition by the ultraviolet irradiation would be insufficiently low while increase of the content of the mercapto groups in excess of 6.0% by weight may have no additional advantageous effects rather with an economical disadvantage in addition to the decrease in the miscibility of the mercaptoalkyl-containing organopolysiloxane with the component (A). The amount of the component (B) in the inventive composition should be in the range from 5 to 300 parts by weight or, preferably, from 40 to 100 parts by weight per 100 parts by weight of the component (A). When the amount of the component (B) is too small, the cured elastomer obtained from the composition by the ultraviolet irradiation would have poor mechanical strengths. When the amount thereof is too large, on the other hand, the composition would have an unduly increased viscosity.

In the unit formulas of the siloxane units of which the mercaptoalkyl-containing organopolysiloxane as the component (B) is composed, the symbol $R^1$ denotes a monovalent hydrocarbon group selected form the same class as that given as the examples of the group $R^1$ in the component (A). The group denoted by $R^2$ is a divalent hydrocarbon group having 2 to 4 carbon atoms or an alkylene group including ethylene, propylene and butylene groups, of which propylene group is preferred so that the mercaptoalkyl group $HSR^2-$ is a 3-mercaptopropyl group. Examples of the mercaptoalkyl-containing organopolysiloxane suitable as the component (B) include those expressed by the following unit formulas:

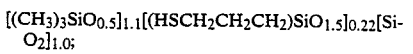

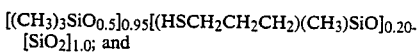

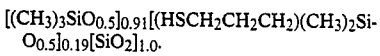

These 3-mercaptopropyl-containing organopolysiloxanes can be prepared by the cohydrolysis of a mixture of organo halogenosilanes or organo alkoxy silanes such as $(CH_3)_3SiX$, $HSCH_2CH_2CH_2SiX_3$, $(HSCH_2CH_2CH_2)(CH_3)SiX_2$ and $(HSCH_2CH_2CH_2)(CH_3)_2SiX$ together with a tetrahalogeno or tetraalkoxy silane $SiX_4$, in which X is a halogen, e.g., chlorine, atom or an alkoxy, e.g., methoxy or ethoxy, group.

The essential organopolysiloxane constituents in the ultraviolet-curable organopolysiloxane composition of the invention are the above described components (A) and (B). When the inventive composition composed of the components (A) and (B) as well as the component (D) described below has an unduly high viscosity depending on the type of the component (B), it is optional or preferable that the viscosity of the composition is decreased by the admixture of a second mercaptoalkyl-containing organopolysiloxane having a relatively low viscosity as the component (C).

The second mercaptoalkyl-containing organopolysiloxane as the optional component (C) is preferably a diorganopolysiloxane of a substantially linear molecular structure having at least two mercaptoalkyl groups bonded to the silicon atoms in a molecule. The component (C) should have a viscosity not exceeding 100,000 centipoise or, preferably, not exceeding 10,000 centipoise at 25° C. Examples of the second mercaptoalkyl-containing organopolysiloxane suitable as the component (C) include those expressed by the following structural formulas, in which Me is a methyl group and the subscripts s, t, u, v and x are each a positive integer:

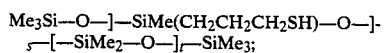

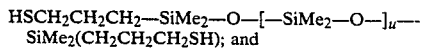

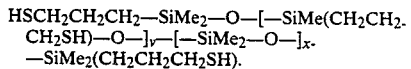

These mercaptoalkyl-containing diorganopolysiloxanes can be prepared by the equilibration polymerization of a mixture composed of a corresponding hexaorganodisiloxane for the terminal units and a cyclic organopolysiloxane oligomer in the presence of an acidic catalyst according to a known procedure.

The second mercaptoalkyl-containing organopolysiloxane as the component (C) should have good miscibility with the components (A) and (B) so that the content of the mercaptoalkyl groups therein should be adequately selected so as not to cause substantial decrease in the miscibility.

Although the component (C) is optional in the inventive composition, it is preferable that the inventive composition is formulated with admixture of the component (C) in order that the composition may have an adequate viscosity as a liquid while a too large amount thereof in the composition may cause an undesirable decrease in the mechanical strengths of the cured elastomer obtained from the composition by the ultraviolet irradiation. In this regard, the amount of the component (C) in the inventive composition should not exceed 300 parts by weight per 100 parts by weight of the component (A). The amount of the component (C) should be appropriately selected in consideration of the overall content of the mercaptoalkyl groups in the components (B) and (C) relative to the content of the alkenyl groups in the component (A) in the composition. Namely, the molar ratio of the overall content o the mercaptoalkyl groups in the components (B) and (C) to the content of the alkenyl groups in the component (A) should be in the range from 0.2:1.0 to 5.0:1.0 or, preferably, from 0.5:1.0 to 2.0:1.0.

The inventive organopolysiloxane composition should contain a photosensitizing agent as the component (D) which serves to promote the addition reaction to form crosslinks between the alkenyl groups in the component (A) and the mercaptoalkyl groups in the component (B) and, optionally, component (C) by the ultraviolet irradiation. Various kinds of known compounds can be used for the purpose including organic peroxides, e.g. benzoyl peroxide, tert-butyl perbenzoate, dicumyl peroxide and tert-butyl peroxide, aromatic ketone compounds, e.g. acetophenone, benzophenone, benzoin ethyl ether, benzoin propyl ether and benzoin butyl ether, and azo compounds, e.g. azobisisobutyronitrile. The amount of the component (D) should be usually in the range from 0.01 to 10% by weight or, preferably, from 1 to 5% by weight based on the overall amount of the components (A), (B) and (C) although the amount is not particularly limitative depending on the desired velocity of the ultraviolet-induced addition reaction to form crosslinks.

The ultraviolet-curable organopolysiloxane composition of the invention can be obtained by merely uniformly blending the above described components (A), (B), (D) and, optionally, (C) each in a calculated and weighed amount. The composition may further optionally be admixed with various kinds of known additives according to need. For example, the composition may be admixed with an antioxidant in an amount from 0.001 to 10% by weight or, preferably, from 0.002 to 1% by weight in order to prevent degradation of the composition by oxidation. Suitable heat resistance improvers or antioxidant compounds include pyrocatechol, hydroquinone and monoethers thereof, alkyl-substituted pyrocatechols, hydroquinone and ethers thereof and the like.

The ultraviolet-curable organopolysiloxane composition of the present invention obtained in the above described manner is a clear liquid suitable for casting or shaping in any desired form and it is converted into a cured silicone rubber elastomer by the irradiation with ultraviolet light to effect crosslink-forming addition reaction between the alkenyl groups in the component (A) and the mercaptoalkyl groups in the component (B) and, when added, component (C). The thus obtained elastomer is transparent and has excellent mechanical properties in comparison with conventional products so that the inventive composition is useful as a material in various applications such as the potting and coating material for electric insulation in electric and electronic parts, adhesive and sealing material in buildings, coating material on articles made of a metal, glass or ceramic, mold-release agent in fabrication of plastics, coating material on optical fibers for optical communication and so on. The cured elastomer of the composition may have particularly high mechanical strengths when the composition is prepared from the component (A) which is an alkenyl-containing organopolysiloxane of a blockwise molecular structure in which several, e.g. 6 to 10, organosiloxane units as a block adjacent to each of the molecular chain ends alone have alkenyl groups, the intervening siloxane units being free from aliphatic unsaturation.

In the following, the ultraviolet-curable organopolysiloxane composition of the invention is described in more detail by way of examples, in which the term "parts" always refers to "parts by weight" and the values of viscosity are all those obtained by the measurement at 25° C.

EXAMPLE 1

(1) Preparation of a mercaptoalkyl-containing organopolysiloxane

A mixture composed of 98 parts of toluene, 229 parts of isopropyl alcohol, 49 parts of 35% hydrochloric acid and 49 parts of water was chilled at 5° C. or below and a mixture composed of 133.4 parts of ethyl orthosilicate, 15.1 parts of 3-mercaptopropyl trimethoxy silane, 61.9 parts of trimethyl chlorosilane and 98 parts of toluene was added thereto dropwise while the mixture in the vessel was kept at a temperature of 20° C. or below. After completion of the dropwise addition of the mixture, the reaction mixture was further agitated for additional 1 hour at a temperature of 60° to 70° C. to complete the reaction and to effect aging of the reaction product. Thereafter, 240 parts of water and 30 parts of sodium sulfate were added to the reaction mixture which was, after agitation for 30 minutes, subjected to filtration and phase separation into aqueous and organic phases. The organic solution thus obtained was repeatedly washed with water to neutrality, dried over anhydrous sodium sulfate and filtered. The filtrate was then heated at 150° C. for 1 hour to evaporate the solvent therein to give a clear and colorless concentrated solution containing 70% by weight of non-volatile matter. The solid constituent in this solution obtained by drying a portion of the solution was identified by analysis to be a mercaptoalkyl-containing organopolysiloxane expressed by the unit formula $$[(CH_3)_3SiO_{0.5}]_{0.89}[HSCH_2CH_2CH_2SiO_{1.5}]_{0.12}[SiO_2]_{1.0}.$$

(2) Preparation of an ultraviolet-curable organopolysiloxane composition

A mixture was prepared by uniformly blending 60 parts of a first methyl vinyl polysiloxane expressed by the structural formula

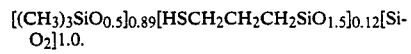

3.6 parts of a second methyl vinyl polysiloxane expressed by the structural formula

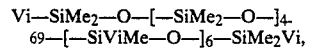

and 57.1 parts of the mercaptoalkyl-containing organopolysiloxane obtained in the manner described in (1) above and the mixture was stripped of toluene by heating at 110° C. under reduced pressure. The mixture was then admixed with 1.0 part of benzoin isobutyl ether to give an ultraviolet-curable organopolysiloxane composition.

(3) Ultraviolet-curing of the composition

The ultraviolet-curable organopolysiloxane composition obtained in the above described manner was cast into a metal mold of 1 mm depth to form a layer of 1 mm thickness which was irradiated from above for 1 second with ultraviolet light coming from a high-pressure mercury lamp of 80 watts/cm output held 10 cm above the surface. The 1 mm thick layer of the organopolysiloxane composition was cured and converted into a transparent silicone rubber sheet having a hardness, JIS, of 27, tensile strength of 14.2 kg/cm² and ultimate elongation of 100%.

COMPARATIVE EXAMPLE 1

An ultraviolet-curable organopolysiloxane composition was prepared in the same formulation as in Example 1 described above except that the mercaptoalkyl-containing organopolysiloxane used in Example 1 was replaced with 41.4 parts of another mercaptoalkyl-containing orgaopolysiloxane of a linear molecular structure expressed by the structural formula

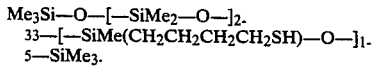
Me₃Si—O—[—SiMe₂—O—]₂.
33—[—SiMe(CH₂CH₂CH₂CH₂SH)—O—]₁.
5—SiMe₃.

This ultraviolet-curable composition was cured an converted into a cured silicone rubber sheet by the ultraviolet irradiation in the same manner as in Example 1. This silicone rubber sheet had a hardness, JIS, of 26 and ultimate elongation of 80% but the tensile strength thereof was only 4 kg/cm².

EXAMPLE 2

(1) Preparation of a mercaptoalkyl-containing organopolysiloxane

The synthetic procedure was substantially the same as in Example 1 except that the amount of the 3-mercaptopropyl trimethoxy silane was increased from 15.1 parts to 26.7 parts and the amount of the trimethyl chlorosilane was increased from 61.9 parts to 78.1 parts to give a mercaptoalkyl-containing organopolysiloxane expressed by the unit formula

[(CH₃)₃SiO₀.₅]₁.₁[HSCH₂CH₂CH₂SiO₁.₅]₀.₂₂[SiO₂]₁.₀.

(2) Preparation of an ultraviolet-curable organopolysiloxane composition

A mixture was prepared by uniformly blending 10 parts of a methyl vinyl polysiloxane expressed by the structural formula

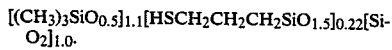
Vi—SiMe₂—O—[—SiMe₂—O—]₄.
53—[—SiViMe—O—]₉—[—SiPh₂—O—]₁.
4—SiMe₂Vi, 57.1 parts of the mercaptoalkyl-containing organopolysiloxane prepared in the above described manner and 1.0 part of benzoin isobutyl ether and treated in substantially the same manner as in (2) of Example 1 to give an ultraviolet-curable organopolysiloxane composition.

(3) Ultraviolet-curing of the composition

The thus obtained ultraviolet-curable organopolysiloxane composition was cured and converted by ultraviolet irradiation in the same manner as in (3) of Example 1 into a cured silicone rubber sheet which had a hardness, JIS, of 31, tensile strength of 8.0 kg/cm² and ultimate elongation of 110%.

EXAMPLE 3

A transparent ultraviolet-curable organopolysiloxane having a viscosity of 1500 centipoise was prepared by uniformly blending 60 parts of a methyl vinyl polysiloxane, in which the vinyl groups were contained only in a block of nine siloxane units adjacent to each of the terminal silicon atoms, expressed by the structural formula

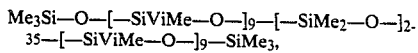
Me₃Si—O—[—SiViMe—O—]₉—[—SiMe₂—O—]₂.
35—[—SiViMe—O—]₉—SiMe₃, 57.1 parts of the mercaptoalkyl-containing organopolysiloxane prepared in substantially the same manner as in (1) of Example 1 excepting increase of the amounts of the 3-mercaptopropyl trimethoxy silane and the trimethyl chlorosilane from 15.1 parts to 26.7 parts and from 61.9 parts to 78.1 parts, respectively, and 1.0 part of benzoin isobutyl ether followed by a treatment of the mixture in the same manner as in (2) of Example 1.

The thus obtained ultraviolet-curable organopolysiloxane composition was cured and converted into a cured silicone rubber sheet by ultraviolet irradiation in the same manner as in (3) of Example 1. The silicone rubber sheet had a hardness, JIS, of 50, tensile strength of 45 kg/cm² and ultimate elongation of 125%.

For comparison, another clear ultraviolet-curable organopolysiloxane composition was prepared in the same formulation as above excepting replacement of 60 parts of the organopolysiloxane having vinyl groups in a block-wise manner with the same amount of another vinyl-containing organopolysiloxane expressed by the structural formula

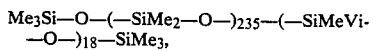
Me₃Si—O—(—SiMe₂—O—)₂₃₅—(—SiMeVi—O—)₁₈—SiMe₃, in which Me is a methyl group, Vi is a vinyl group and the units of (—SiMe₂—O—) and (—SiMeVi—O—) were distributed at random along the molecular chain. The composition had a viscosity of 1100 centipoise. Ultraviolet irradiation of this composition carried out in the same manner as above gave a cured silicone rubber having a hardness, JIS, of 55 while the tensile strength and ultimate elongation thereof could not be determined because of the fragility of the sample sheet.

COMPARATIVE EXAMPLE 2

An ultraviolet-curable organopolysiloxane composition was prepared in the same formulation as in Example 3 described above except that the mercaptoalkyl-containing organopolysiloxane used in Example 3 was replaced with 88.9 parts of the mercaptoalkyl-containing organopolysiloxane used in Comparative Example 1 followed by the same treatment of the mixture as in (2) of Example 1. This ultraviolet-curable organopolysiloxane composition was cured and converted by ultraviolet irradiation in the same manner as in (3) of Example 1 into a cured silicone rubber sheet which had a hardness, JIS, of 38, tensile strength of 14 kg/cm² and ultimate elongation of 85%.

EXAMPLE 4

(1) Preparation of a mercaptoalkyl-containing organopolysiloxane

The synthetic procedure was substantially the same as in (1) of Example 1 except that the 3-mercaptopropyl trimethoxy silane used in Example 1 was replaced with 21.9 parts of 3-mercaptopropyl dimethoxy methyl silane and the amount of the trimethyl chlorosilane was increased from 61.9 parts to 63.3 parts to give a mercaptoalkyl-containing organopolysiloxane expressed by the unit formula $$[(CH_3)_3SiO_{0.5}]_{0.95}[(HSCH_2CH_2CH_2)(CH_3)SiO]_{0.20}[SiO_2]_{1.0}.$$

(2) Preparation of an ultraviolet-curable organopolysiloxane composition

A transparent ultraviolet-curable organopolysiloxane composition having a viscosity of 1400 centipoise was prepared from 60 parts of the same methyl vinyl polysiloxane as used in Example 3, 57.1 parts of the mercaptoalkyl-containing organopolysiloxane obtained in the above described manner and 1.0 part of benzoin isobutyl ether in substantially the same procedure as in (2) of Example 1.

(3) Ultraviolet-curing of the composition

The ultraviolet-curable organopolysiloxane composition prepared in the above described manner was cured and converted by ultraviolet irradiation in the same manner as in (3) of Example 1 into a cured silicone rubber sheet which had a hardness, JIS, of 38, tensile strength of 42 kg/cm² and ultimate elongation of 130%.

EXAMPLE 5

(1) Preparation of a meraptoalkyl-containing organopolysiloxane

The synthetic procedure was substantially the same as in (1) of Example 1 except that the 3-mercaptopropyl trimethoxy silane used in Example 1 was replaced with 19.98 parts of 3-mercaptopropyl methoxy dimethyl silane and the amount of the trimethyl chlorosilane was increased from 61.9 parts to 63.3 parts to give a mercaptoalkyl-containing organopolysiloxane expressed by the unit formula $$[(CH_3)_3SiO_{0.5}]_{0.91}[(HSCH_2CH_2CH_2)(CH_3)_2SiO_{0.5}]_{0.19}[SiO_2]_{1.0}.$$

(2) Preparation of an ultraviolet-curable organopolysiloxane composition

A transparent ultraviolet-curable organopolysiloxane composition having a viscosity of 1550 centipoise was prepared from 60 parts of the same methyl vinyl polysiloxane as used in Example 3, 57.1 parts of the mercaptoalkyl-containing organopolysiloxane prepared in (1) described above and 1.0 parts of benzoin isobutyl ether in the same procedure as in (2) of Example 1.

(3) Ultraviolet-curing of the composition

The ultraviolet-curable organopolysiloxane composition prepared in (2) described above was cured and converted by ultraviolet irradiation in the same manner as in (3) of Example 1 into a cured silicone rubber sheet which had a hardness, JIS, of 51, tensile strength of 50 kg/cm² and ultimate elongation of 130%.

EXAMPLE 6

A transparent ultraviolet-curable organopolysiloxane composition having a viscosity of 2300 centipoise was prepared from 53.7 parts of a methyl vinyl polysiloxane of a block-wise molecular structure, in which the vinyl groups were contained only in the block of several siloxane units adjacent to each of the terminal silicon atoms, which was the same one as used in Example 3, 28.6 parts of the mercaptoalkyl-containing organopolysiloxane prepared in (2) of Example 2, 23.3 parts of another mercaptoalkyl-containing organopolysiloxane of a linear molecular structure expressed by the structural formula $$Me_3Si-O-[-SiMe_2-O-]_{9.5}-[-SiMe(CH_2CH_2CH_2SH)-O-]_5-SiMe_3,$$

and 1.0 part of benzoin isobutyl ether. This ultraviolet-curable organopolysiloxane composition was cured and converted by ultraviolet irradiation in the same manner as in (3) of Example 1 into a cured silicone rubber sheet which had a hardness, JIS, of 38, tensile strength of 72 kg/cm² and ultimate elongation of 200%.

COMPARATIVE EXAMPLE 3

An ultraviolet-curable organopolysiloxane composition was prepared in substantially the same procedure as in (2) of Example 1 from 53.7 parts of the same methyl vinyl polysiloxane as used in Example 6, 48.5 parts of the same mercaptoalkyl-containing organopolysiloxane of a linear molecular structure as used in Example 6 and 1.0 part of benzoin isobutyl ether. This ultraviolet-curable organopolysiloxane composition was cured and converted by ultraviolet irradiation in the same manner as in (3) of Example 1 into a cured silicone rubber sheet which had a hardness, JIS, of 31, tensile strength of 14 kg/cm² and ultimate elongation of 135%.

EXAMPLE 7

(1) Preparation of a mercaptoalkyl-containing organopolysiloxane

The synthetic procedure was substantially the same as in (1) of Example 1 except that the amount of the 3-mercaptopropyl trimethoxy silane was increased from 15.1 parts to 44.0 parts and the amount of the trimethyl chlorosilane was decreased from 61.9 parts to 60.5 parts to give a mercaptoalkyl-containing organopolysiloxane expressed by the unit formula $$[(CH_3)_3SiO_{0.5}]_{0.87}[HSCH_2CH_2CH_2SiO_{1.5}]_{0.35}[SiO_2]_{1.0}.$$

(2) Preparation of an ultraviolet-curable organopolysiloxane composition

An ultraviolet-curable organopolysiloxane composition was prepared in substantially the same procedure as in (2) of Example 1 from 75.7 parts of the methyl phenyl vinyl polysiloxane of a blockwise molecular structure, in which the vinyl groups were contained only in a block of several siloxane units adjacent to each of the terminal silicone atoms, expressed by the structural formula

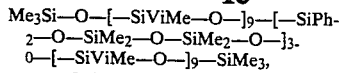

28.6 parts of the mercaptoalkyl-containing organopolysiloxane prepared in (1) described above, 4.3 parts of a 3-mercaptopropyl methyl polysiloxane, which was a mixture composed of a poly(methyl 3-mercaptopropyl siloxane) terminated at the molecular chain ends with methoxy groups and a cyclic (methyl 3-mercaptopropyl siloxane) oligomer, and 1.0 part of benzoin isobutyl ether.

(3) Ultraviolet-curing of the composition

The thus prepared ultraviolet-curable organopolysiloxane composition was cured and converted by ultraviolet irradiation in the same manner as in (3) of Example 1 into a cured silicone rubber sheet which had a hardness, JIS, of 63, tensile strength of 18 kg/cm² and ultimate elongation of 50%.

What is claimed is:

1. An organopolysiloxane composition curable by irradiation with ultraviolet light which comprises, in admixture:

(A) 100 parts by weight of a diorganopolysiloxane having a viscosity not exceeding 100,000 centipoise at 25° C. represented by the general formula

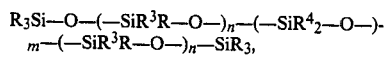

in which R is a saturated or unsaturated monovalent hydrocarbon group, $R^3$ is an alkenyl group having 2 to 4 carbon atoms, $R^4$ is a monovalent hydrocarbon group free from aliphatic unsaturation, the subscript m is a positive integer of an least 6 and the subscript n is a positive integer of at least 3, the alkenyl group-containing siloxane units ($-SiR^3R-O-$) and alkenyl group-free siloxane units ($-SiR^4_2-O-$) forming respective blocks;

(B) from 5 to 300 parts by weight of a mercaptoalkyl-containing organopolysiloxane essentially composed of monofunctional siloxane units of the formula $R^1_3SiO_{0.5}$, tri-, di- or monofunctional siloxane units of the formula $R^1_a(HSR^2)SiO_{(3-a)/2}$ and tetrafunctional siloxane units of the formula $SiO_2$, in which $R^1$ is a monovalent hydrocarbon group free from aliphatic unsaturation, $R^2$ is a divalent hydrocarbon group having 2 to 4 carbon atoms and the subscript a is zero, 1 or 2, in such a proportion that the molar ratio of $[R^1_3SiO_{0.5}+R^1_a(HSR^2)SiO_{(3-a)/2}]/SiO_2$ is in the range from 0.5 to 2.5 and the content of the mercapto groups HS is in the range from 0.4 to 6.0% by weight; and (D) a photosensitizer in an amount from 0.01 to 10% by weight based on the overall amount of the components (A) and (B), the molar ratio of the mercaptoalkyl groups in the component (B) to the alkenyl groups in the component (A) being in the range from 0.2:1.0 to 5.0:1.0.

2. The ultraviolet-curable organopolysiloxane composition as claimed in claim 1 which further comprises:

(C) up to 300 parts by weight of a mercaptoalkyl-containing organopolysiloxane of a substantially linear molecular structure having a viscosity not exceeding 100,000 centipoise at 25° C. and containing at least two mercaptoalkyl groups per molecule, the other organic groups bonded to the silicon atoms being monovalent hydrocarbon groups free from aliphatic unsaturation, the molar ratio of the mercaptoalkyl groups in the components (B) and (C) to the alkenyl groups in the component (A) being in the range from 0.2:1.0 to 5.0:1.0 and the amount of the component (D) being in the range from 0.01 to 10% by weight based on the overall amount of the components (A), (B) and (C).

3. The ultraviolet-curable organopolysiloxane composition as claimed in claim 1 wherein the mercaptoalkyl group is a 3-mercaptopropyl group.

4. The ultraviolet-curable organopolysiloxane composition as claimed in claim 1 wherein the alkenyl group in the component (A) is a vinyl group.

5. The ultraviolet-curable organopolysiloxane composition as claimed in claim 1 wherein the monovalent hydrocarbon group denoted by $R^1$ is a methyl or phenyl group.

6. The ultraviolet-curable organopolysiloxane composition as claimed in claim 1 wherein the photosensitizer is a compound selected from the class consisting of organic peroxides, aromatic ketone compounds and azo compounds.

* * * * *